Patented Sept. 4, 1934

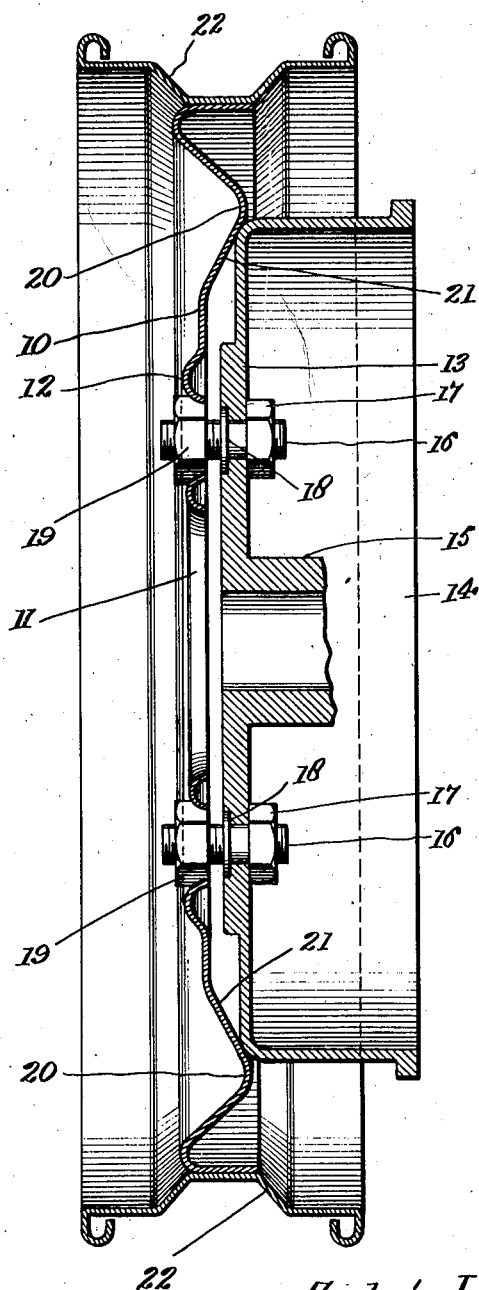

1,972,664

UNITED STATES PATENT OFFICE 1,972,664

WHEEL

André Jules Michelin, Paris, France, assignor to Michelin et Cie, Clermont-Ferrand, France, a corporation of France Application December 17, 1930, Serial No. 501,346
In France December 20, 1929

2 Claims. (Cl. 301—6)

The present invention relates to wheels, adapted particularly for self-propelled vehicles and the like and has for an object to provide a wheel with means for supporting the same from a brake drum or other projection which is carried by the hub or other centrally located part upon which the wheel may be mounted or with which the wheel may turn so as to support the wheel against lateral and circumferential strains at a point distant radially from the hub.

Another feature of the present invention is to provide a wheel structure adapted to engage the brake drum or web thereof in a line of contact concentric to the axis of the wheel and drum and which may co-operate with the usual wheel securing bolts or the like for placing the wheel under the desired tension against the brake drum or its flange for insuring the desired bearing of the wheel against its support and thus distribute the lateral and circumferential stresses between the wheel and the supporting brake drum.

Another feature of the present invention is to provide a wheel structure embodying the above characteristics and where when tension is placed upon the central portion of the wheel, the stresses set up in such portion of the wheel will be transferred to the brake drum or its equivalent support.

The invention also aims at the provision of certain features which may be embodied in all types of wheels, and which is particularly adapted to wheels of the disc type.

With the foregoing and other objects in view, the invention will be more fully described hereinafter, and will be more particularly pointed out in the claims appended hereto.

In the drawing, wherein like symbols refer to like or corresponding parts throughout the several views, The figure shows a transverse section taken through a disc wheel and its brake drum, the section being taken along the axis of the same.

Referring now to the drawing, the wheel 10 is shown as of the disc type and is provided with a central opening 11 and a plurality of independent nut receiving sockets 12 stamped or otherwise suitably formed in the body of the wheel 10 and in a circular row concentric to the opening 11, and with the pockets 12 spaced apart the desired distance to accommodate the desired number of fastening elements.

The wheel 10 is adapted to be secured against the outer side of the web or flange 13 of the brake drum 14, the latter having a hub 15 in the usual manner. The fastening devices may be of any desired type and in the present instance are shown in the form of threaded bolts 16 which pass through the drum flange 13 and through the adjacent pockets 12.

Each bolt 16 has on its inner end a clamping nut 17 disposed within the drum 14 and engaging against the inner side of the web 13 for co-action against a fixed collar or washer 18 disposed upon the intermediate portion of the bolt 16 and countersunk in the outer face of the web 13 as shown. The outer end of the bolt 16 passes freely through the adjacent pocket 12 and carries a relatively large clamping nut 19 adapted to seat in the pocket and bear against the side walls thereof for binding the central portion of the wheel 10 against the brake drum.

Outwardly of the circular row of pockets 12, and in register with the peripheral edge portion of the drum flange 13, the wheel body is provided with a transverse annular rim 20 presenting a bearing surface 21 which is of annular formation and which inclines radially inward toward the axis of the wheel 10 and is adapted to bear against the outer edge of the drum 14 where it merges into the flange 13 so that the rim 20 provides a bearing member or surface carried by the wheel adapted to engage the outer portion of the brake drum and support the outer portion of the wheel directly from the brake drum and relieve, to a large extent, the central portion of the wheel against the supporting stresses imposed on the wheel 10.

The fastening devices 16 when drawn up are adapted to bind the bearing surface 21 against the brake drum or its web 13 so that the brake drum web 13 in effect becomes the major portion of the central part of the wheel and, as the brake drum flange or web 13 is relatively heavy and strong, the outer portion of the wheel is thus supported to a greater extent through the brake drum.

The wheel body 10 is provided with a rim 22 of any suitable construction adapted to carry the tire and the rim 22 may of course be given any suitable construction or configuration, and may be made in any desired number of parts to accomplish the desired purpose.

It is apparent that with a wheel of this construction, the wheel may be lighter in weight than those at present used as the stresses are relieved from the central portion of the wheel to a large extent and are carried directly through the relatively strong and rigid brake drum or its equivalent which is carried on the hub portion 15. The wheel will also offer a greater resistance to lateral stresses than in wheels which are supported wholly and directly from the central portion of the wheel.

The structure is such that the tension placed on the central portion of the wheel increases the binding action of the wheel against the brake drum at a point near the rim 22 so as to further insure a rigid support for the wheel.

It is also apparent that the wheel when positioned upon the hub may or may not have two points of contact with the hub, the bearing surface 21 being so offset toward the inner side of the wheel as to first engage the supporting flange or web 13 and the subsequent tightening of the central portion of the wheel may be carried out to an extent sufficient to engage the central portion against the hub or not as desired.

It is obvious that various changes and modifications may be made in the details of construction and design of the above specifically described embodiment of this invention without departing from the spirit thereof, such changes and modifications being restricted only by the scope of the following claims:

What is claimed is:—

1. A vehicle wheel comprising a disk like body portion having an annular rib forming a radial seating fulcrum and inwardly thereof a bolt circle having plural annular seating zones inwardly and outwardly of said bolt circle.

2. In a vehicle wheel of the demountable bolted on type, the combination of a brake drum and a disc like wheel body including an annular rib seating upon said brake drum and inwardly of said rib, a bolting on circle having annular seating zones inwardly and outwardly thereof.

ANDRÉ JULES MICHELIN.